United States Patent [19]

Takii et al.

[11] Patent Number: 5,048,471
[45] Date of Patent: Sep. 17, 1991

[54] INTAKE SYSTEM FOR AUTOMOTIVE ENGINE

[75] Inventors: Osamu Takii; Iwao Masumoto, both of Iwata, Japan

[73] Assignee: Yamaha Hatsudoki Kabushiki Kaisha, Iwata, Japan

[21] Appl. No.: 585,283

[22] Filed: Sep. 18, 1990

Related U.S. Application Data

[63] Continuation of Ser. No. 420,044, Oct. 11, 1989, abandoned.

[30] Foreign Application Priority Data

Oct. 12, 1988 [JP] Japan .................................. 63-256569

[51] Int. Cl.⁵ ............................................ F02M 35/10
[52] U.S. Cl. .............................. 123/52 MV; 123/432
[58] Field of Search ......... 123/52 M, 52 MV, 52 MB, 123/52 MC, 308, 432, 306

[56] References Cited

U.S. PATENT DOCUMENTS

| | | | |
|---|---|---|---|
| 2,963,009 | 12/1960 | Dolza | 123/52 MC |
| 4,615,324 | 10/1986 | Choushi et al. | 123/52 MV |
| 4,641,610 | 2/1987 | Rutschmann | 123/52 MV |
| 4,649,876 | 3/1987 | Ohmi et al. | 123/302 |
| 4,702,203 | 10/1987 | Ohmi et al. | 123/52 MV |
| 4,809,647 | 3/1989 | Masumoto et al. | 123/52 MB |
| 4,827,879 | 5/1989 | Ohmi et al. | 123/52 MV |

FOREIGN PATENT DOCUMENTS

| | | | |
|---|---|---|---|
| 2591665 | 6/1987 | France. | |
| 0115460 | 7/1984 | Japan | 123/52 MV |
| 2180594A | 4/1987 | United Kingdom. | |

*Primary Examiner*—David A. Okonsky
*Attorney, Agent, or Firm*—Ernest A. Beutler

[57] ABSTRACT

An improved compact high performance induction system for a V-type engine. The induction system includes a pair of plenum chambers each disposed above a respective one of the cylinder heads and each plenum chamber is provided with runners that serve common intake passages of both the adjacent and remotely positioned cylinder heads.

13 Claims, 2 Drawing Sheets

INTAKE SYSTEM FOR AUTOMOTIVE ENGINE

This is a continuation of U.S. patent application Ser. No. 420,044, filed Oct. 11, 1989 INTAKE SYSTEM FOR AUTOMOTIVE ENGINE, now abandoned.

BACKGROUND OF THE INVENTION

This invention relates to an intake system for an automotive engine and more particularly to a compact high performance induction system for such engines.

Recently it has been discovered that the performance of an internal combustion engine through out its entire speed and load ranges can be improved without compromising the performance under any condition by employing a pair of separately tuned intake passages for each cylinder with one of the passage being tuned to optimize low speed performance and the other passage being tuned to increase high speed performance. Such an arrangement is shown in U.S. Pat. No. 4,649,876, entitled "Intake Means Of Internal Combustion Engine" issued March 17, 1987 and assigned to the Assignee hereof. The induction system in that patent is depicted in combination with a V-type of engine and employs a pair of plenum chambers each of which lies over a respective one of the cylinder heads. A first intake passage extends from each plenum chamber to an intake port of the adjacent cylinder head and a second intake passage extends from the other plenum chamber to another intake port of the same cylinder of the cylinder head. A throttle valve arrangement is also incorporated and the first and second intake passages are tuned so as to serve high and low speed ranges of the engine, respectively. Although such an arrangement is highly effective in increasing the performance of the engine, as aforenoted, throughout its entire speed and load ranges, the induction system is rather complicated and because of its complexity can prevent the use of as low a hood line as may be desired.

It is, therefore, a principle object of this invention to provide an improved high performance induction system that is more compact in nature.

It is a further object of this invention to provide a high performance induction system for a V-type engine which will permit the use of low hood lines.

It is yet a further object of this invention to provide an improved compact and yet high performance induction system for V-type engines.

SUMMARY OF THE INVENTION

The invention is adapted to be embodied in an induction system for an internal combustion engine having a pair of angularly disposed cylinder banks each formed with at least one cylinder bore. A pair of cylinder heads are provided each of which is affixed to a respective one of the cylinder banks for closing the cylinder bore thereof. A pair of plenum chambers are provided each of which lies generally vertically above a respective one of the cylinder heads. An intake passage is formed in the cylinder head for supplying each cylinder bore with an intake charge. A plurality of first manifold runner are incorporated each of which expends from one of the plenum chambers to intake passages of the adjacent cylinder heads. A plurality of second manifold runners are also provided each of which extends from one of the plenum chambers to respective ones of the intake passages of the other cylinder heads. The first manifold runners are substantially shorter than the second manifold passages.

DETAILED DESCRIPTION OF THE PREFERRED EMBODIMENTS OF THE INVENTION

Figure 1:
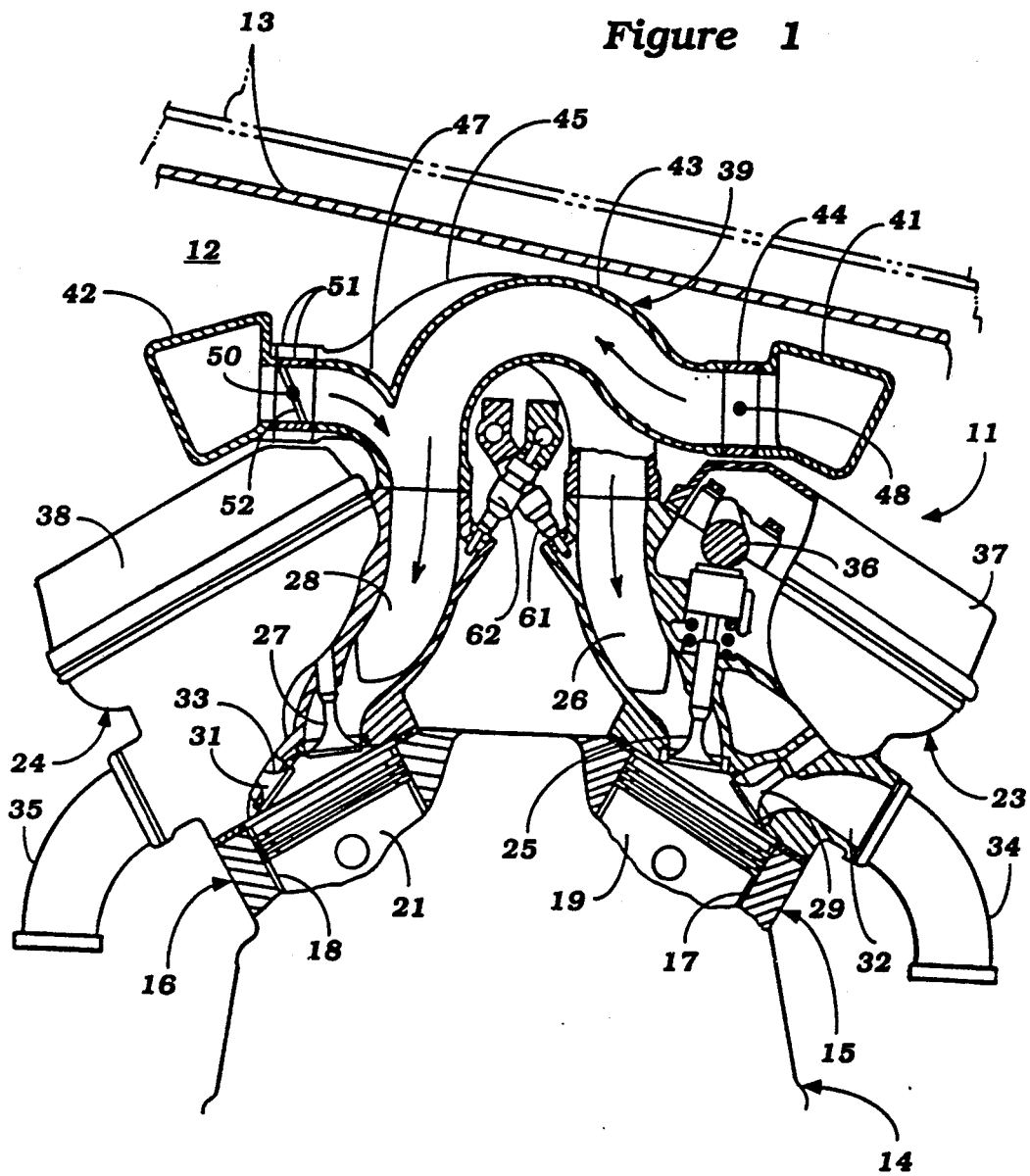
FIG. 1 is a cross sectional view, taken generally along the line 1—1 of FIG. 2, showing a portion of an internal combustion engine constructed in accordance with an embodiment of the invention as located in the engine compartment of a motor vehicle.

An internal combustion engine having an induction system constructed in accordance with an embodiment of the invention is identified generally by the reference numeral 11. The engine 11 is, in the illustrated embodiment, positioned transversely in an engine compartment 12 of a motor vehicle in the orientation normally used for front engine, front wheel drive applications. Although the invention has utility in other applications, it is particularly adapted for such installation. Because of the configuration of the induction system, it is possible to lower the hood line 13 of the vehicle considerably as shown in the difference between the phantom and solid line views in FIG. 1.

The engine 11 is of the V-type and is formed with a cylinder block, indicated generally by the reference number 14 which is formed with angularly disposed cylinder banks 15 and 16. The way the engine 11 is positioned in the engine compartment 12 the cylinder bank 15 comprises the front cylinder bank while the cylinder bank 16 comprises the rear cylinder bank. The front of the vehicle is indicated by the arrow Fr.

In the illustrated embodiment, the engine 11 is of the V-6 type and to that end there are provided three cylinder bores 17 in the front cylinder bank 15 and three cylinder bores 18 in the rear cylinder bank 16. It is to understood, however, that the invention may be employed in conjunction with engines having other numbers of cylinders.

Pistons 19 are slidably supported in the cylinder bore 17 and pistons 21 are slidably supported in the cylinder bores 18. Connecting rods (not shown) interconnect the pistons 19 and 21 with a crankshaft which is also not shown since this construction may be considered to be conventional. It should be noted that the cylinder bores 17 of the cylinder bank 15 are staggered relative to the cylinder bores 18 of the cylinder bank 16 so as to permit side by side placement of the connecting rods on the crankshaft, as is well known.

Figure 2:
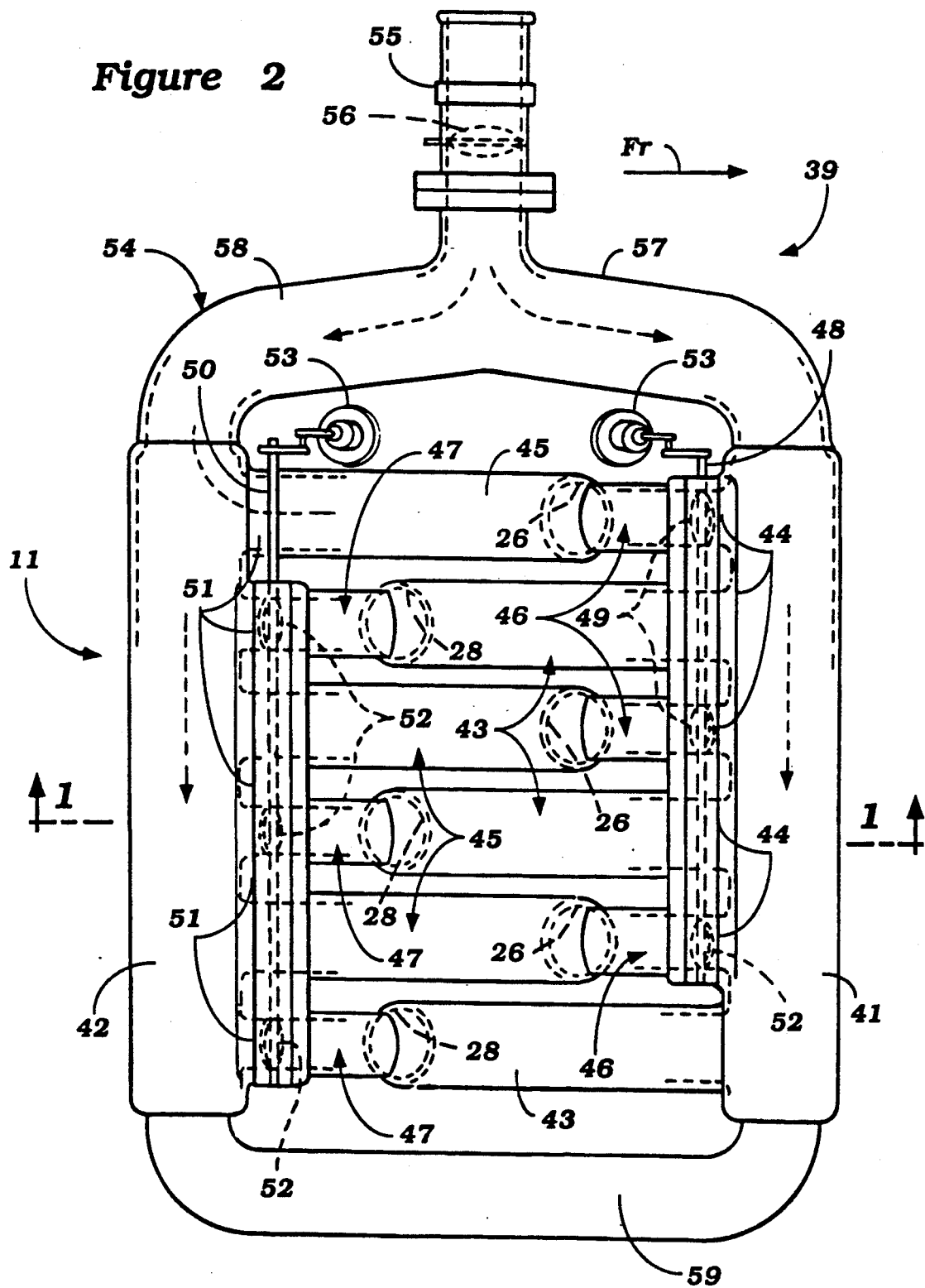
FIG. 2 is a top plan view of the induction system of the engine.

Cylinders heads 23 and 24 are affixed in a known manner to the cylinder banks 15 and 16, respectively. The cylinder head 23 supports pairs of intake valves 25 for each of the cylinder bores 17 with the intake valves controlling the flow through intake ports that are served by a common intake passage that extends generally vertically upwardly and which terminates in a horizontally extending surface of the cylinder 23. In a like manner, intake valves 27 are supported in the cylinder head 24 and are served by common intake ports 28 which also extend vertically upwardly through the cylinder head 24 and terminate in a horizontal surface thereof. As may be best seen in FIG. 2, the staggering of the cylinder bores 17 and 18 permits the intake passages 26 of the cylinder head 24. This permits the use of the simple induction system which nevertheless provides a high power output as will be described.

Pairs of exhaust valves 29 and 31 are disposed in the cylinder heads 23 and 24 respectively for each cylinder bore for controlling the flow through respective exhaust passages 32 and 33. The exhaust gases are delivered to respective exhaust manifolds 34 and 35 which cooperate with any suitable type of exhaust system which may be considered to be conventional and, for that reason, is not illustrated.

The intake and exhaust valves 25, 27, 29 and 31 are operated by means of individual overhead mounted camshafts, only one of which, the intake camshaft for the cylinder head 23 is illustrated and is identified by the reference numeral 36. The camshafts for the L-train may be driven in a manner as described in U.S. Pat. No. 4,643,143, entitled "Valve Driving Means for V-Type Engine Of Vehicle", issued Feb. 17, 1987 and assigned to the Assignee of this application. The camshafts 36 are contained within camcovers 37 and 38 that are affixed to the cylinder heads 23 and 24 in a known manner.

In accordance with the invention, the engine 11 is provided with an induction system, indicated generally by the reference numeral 39 which is designed so as to provide a compact construction and nevertheless high performance through out the entire engine speed and load ranges. The induction system 39 includes first and second plenum chambers 41 and 42 that lie above the cylinder heads 23 and 24 and which are disposed generally adjacent the intake sides thereof. In the illustrated embodiment, the plenum chambers 41 and 42 are positioned approximately at the same location relative to the respective cylinder heads 23 and 24. If desired and for tuning purposes, the distance between the plenum chambers 41 and 42 and the respective cylinder heads 23 and 24 may be varied.

A first series of intake runners 43 extend from discharge ports 44 formed in the plenum chamber 41 to each of the intake ports 28 of the cylinder head 24. In a like manner, a similar first series of intake runners 45 extend from the plenum chamber 42 to each of the intake ports 26 of the cylinder head 23. The intake runners 43 and 45 are, therefore, of a relatively great length and are tuned so as to provide good running at low and medium engine speeds. In order to facilitate this tuning, the runners 43 and 44 may be formed within an inverted U-shaped in the valley of the engine so as to extend to a height somewhat greater than the plenum chambers 41 and 42. This may be conveniently done without interfering with the lowering of the hood line 13.

A second series of runners 46 extend from the plenum chamber 41 to the intake ports 26 of the adjacent cylinder head 23. The intake runners 46 intersect the runners 45 and are aligned with them along the length of the engine. However, it should be noted that the effective length of the intake runners 46 is substantially less of the intake runners 45 so that the runners 46 are tuned for high speed performance. In a like manner, a second series of intake runners 47 extend from the plenum chamber 42 to the intake ports 26 of the adjacent cylinder head 24. These runners 47 are like the runners 46 relatively short in length and thus are tuned for improved high speed performance.

An intake air control throttle valve shaft 48 extends through the plenum chamber outlets 44 and contains throttle valves 49 that control the flow through the high speed runners 46. In a like manner, an intake air control throttle valve shaft 50 extends through outlets 51 of the plenum chamber 42 that serves its intake runners 45 and 47. Throttle valves 52 are supported on the shaft 51 in the intake runners 47 so as to control the air flow therethrough. Vacuum motors 53 which are responsive to intake manifold vacuum may be connected to the throttle valve shafts 48 and 50 so as to control the opening of the throttle valves 49 and 52 respectively. Alternatively, the throttle valves 49 and 52 may be controlled by means of a throttle valve linkage that is connected to the main throttle valve, to be described.

Atmospheric air is delivered to the plenum chambers 41 and 42 by a generally Y-shaped intake pipe 54 having a throttle body 55 positioned at its inlet end in which a speed controlling throttle valve 56 is provided. The throttle valve 56 is operated by the operator in a known manner. As has been previously noted, the throttle valves 49 and 52 may be linked with the throttle valve 56 so as to open in a staged sequence rather than using the automatic control previously described. Induction air is delivered to the throttle body 55 from an air cleaner (not shown).

The intake pipe 56 further includes a pair of branch passages 57 and 58 that extend to one end of the plenum chambers 41 and 42 respectively for delivering intake air thereto. If desired, a further interconnecting manifold 59 may extend between the opposite ends of the plenum chambers 41 and 42 so as to further improve the performance of the engine.

Fuel injection nozzles 61 and 62 are supported in the cylinder heads 23 and 24, respectively, and discharge into their respective intake passages 26 and 28 for forming a combustible charge for the individual combustion chambers. The fuel injection nozzles 61 and 62 can be supplied with fuel in a known manner under the control of an air flow detector that is positioned in a common portion of the induction system 39 so as to sense total mass flow to the engine.

It should be readily apparent from the described construction that the induction system 39 permits tuning for all engine running speeds and ranges and hence provides good performance in a compact construction. In the illustrated embodiment, the high speed runners 46 and 47 are of smaller cross sectional area than the low speed runners 43 and 45. However, the respective cross sectional areas and lengths can be varied to suit given engine requirements. Also, it is to be understood that the foregoing description is that of the preferred embodiments of the invention and various changes and modifications may be without departing from the spirit and scope of the invention, as defined by the appended claims.

We claim:

1. An induction system for an internal combustion engine having a pair of angularly disposed cylinder banks each formed with at least one cylinder bore, a pair of cylinder heads each affixed to a respective one of said cylinder banks and closing the cylinder bore thereof, a pair of plenum chambers each lying generally vertically above a respective one of said cylinder heads, intake passages formed in said cylinder heads for supplying each cylinder bore thereof with an intake charge, a series of first intake runners extending from each of said plenum chambers to the intake passages of the adjacent cylinder head, a series of second intake runners extending from each of said plenum chambers to the intake passages of the remotely positioned cylinder head, said first intake runners being substantially shorter than said second intake runners, said first and said second intake runners being arranged in pairs with each of said pairs comprising a first and second runner merging together externally of said plenum chambers to form a common passage and opening communicating with a respective one of said intake passages.

2. An induction system for an internal combustion engine as set forth in claim 1 wherein the first runner associated with one of the plenum chambers is aligned with the second runner of the other plenum chamber and serves the same cylinder of the respective head.

3. An induction system for an internal combustion engine as set forth in claim 1 wherein there are a plurality of cylinder bores in each of the cylinder banks and respective first and second runners serving the intake passages of each of said cylinders.

4. An induction system for an internal combustion engine as set forth in claim 3 wherein the cylinder banks are staggered and the intake passages of the cylinder heads are staggered.

5. An induction system for an internal combustion engine as set forth in claim 4 wherein the first runner associated with one of the plenum chambers is aligned with the second runner of the other plenum chamber and serves the same cylinder of the respective head.

6. An induction system for an internal combustion engine as set forth in claim 1 wherein the second series of runners have an inverted U-shape.

7. An induction system for an internal combustion engine as set forth in claim 6 wherein the U-shaped portion of the second series of runners extends vertically above either of the plenum chambers.

8. An induction system as set forth in claim 1 further including throttle valve means positioned externally of said plenum chambers and continuous to the point of merger of said first and second runners and in only one of said first and second runners for controlling the flow therethrough.

9. An induction system as set forth in claim 8 wherein the throttle valve means is positioned in the first runners.

10. An induction system as set forth in claim 9 wherein the throttle valve means are provided in a separate valve body affixed to one side of the respective plenum chamber.

11. An induction system as set forth in claim 1 wherein the first and second runners emanate from facing sides of the plenum chambers.

12. An induction system as set forth in claim 1 further including a common air inlet device serving both of said plenum chambers at one end thereof and throttle valves located therein for controlling the flow of air to said plenum chambers.

13. An induction system as set forth in claim 12 further including means communicating said plenum chambers with each other at the other end thereof.

* * * * *

UNITED STATES PATENT AND TRADEMARK OFFICE
CERTIFICATE OF CORRECTION

PATENT NO. : 5,048,471

DATED : September 17, 1991

INVENTOR(S) : Takii, et al

It is certified that error appears in the above-identified patent and that said Letters Patent is hereby corrected as shown below:

Column 6, line 7, Claim 8, "continuous" should be --contiguous--.

Signed and Sealed this

Thirteenth Day of July, 1993

Attest:

MICHAEL K. KIRK

Attesting Officer

Acting Commissioner of Patents and Trademarks